Sept. 16, 1947.  J. W. MILLER ET AL  2,427,615
THERMOSTAT
Filed Feb. 10, 1944  2 Sheets-Sheet 1

INVENTOR.
JOHN W. MILLER
BY RAYMOND E. FELL

ATTORNEY

Sept. 16, 1947.　　J. W. MILLER ET AL　　2,427,615
THERMOSTAT
Filed Feb. 10, 1944　　2 Sheets-Sheet 2

INVENTOR.
JOHN W. MILLER
BY RAYMOND E. FELL

*Carroll R. Taber*

ATTORNEY

Patented Sept. 16, 1947

2,427,615

UNITED STATES PATENT OFFICE 2,427,615

THERMOSTAT

John W. Miller and Raymond E. Fell, Lansing, Mich., assignors to Motor Wheel Corporation, Lansing, Mich., a corporation of Michigan Application February 10, 1944, Serial No. 521,804

4 Claims. (Cl. 200—52)

This invention relates to electrical controls for heating apparatus and more particularly to controls which are actuated by changes in either or both the temperature and humidity of the environment in which the control is located.

It is a well known phenomenon that a person tends to feel warmer in an atmosphere of high humidity than in an atmosphere at the same temperature but with a lower moisture content. Therefore, it is desirable to increase the temperature of a room slightly if the humidity decreases and to decrease the temperature slightly if the humidity increases.

The present invention has for its principal object the provision of a thermostat for automatically regulating the supply of heat to the room in which the thermostat is placed in accordance with variations in either or both the temperature and the humidity, so that a person occupying the room will feel comfortable at all times.

Another object of the invention is to provide a device of this character which is of simple and inexpensive construction.

A still further object of the invention is to provide a control of the above mentioned character which is extremely sensitive and which will be actuated by minute changes in both temperature and humidity.

These objects will more fully appear in the following specification when read in connection with the accompanying drawings, wherein.

Figure 1:
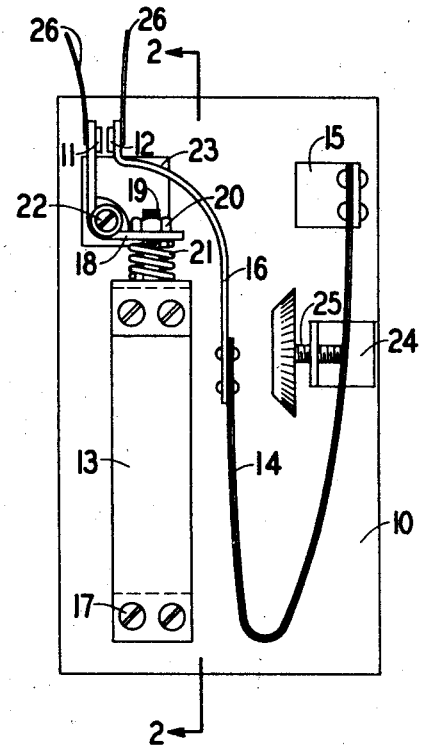
Figure 1 is an elevational view of a simple form of thermostat embodying the present invention.
Figure 2:
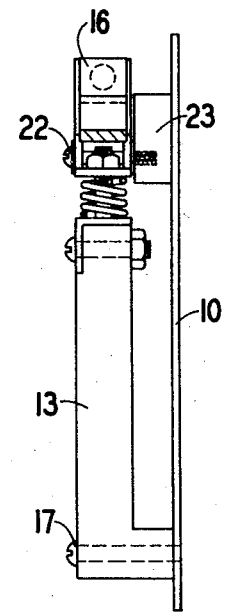
Figure 2 is a side elevational view of the same.

Referring now more particularly to Figures 1 and 2, which disclose an extremely simple form of the invention, it will be seen that the thermostat comprises a base 10, a pair of relatively movable contacts 11 and 12, a humidity responsive element 13 for moving contact 11, and a temperature responsive element 14 for moving contact 12. The parts are so arranged that the switch points 11 and 12 are moved toward each other upon a decrease in ambient temperature or upon a decrease in ambient humidity and moved away from each other upon an increase in ambient temperature The base 10 may be a flat piece of any suitable material. An angle bracket 15 is rigidly secured to the base 10 and carries a long bimetallic strip which forms the temperature responsive element 14. The bimetallic strip is reversely bent upon itself, as indicated in Figure 1. One end is mounted on the bracket 15 while the other end carries a relatively rigid bar 16 on the end of which switch point 12 is mounted. The bimetallic strip is designed so that upon a decrease in temperature it bends to the left, as shown in Figure 1, so as to move switch point 12 toward switch point 11.

An elongated block of hygroscopic material which expands when it absorbs moisture forms the humidity responsive element 13. The block 13 may be of wood or other similar material. One end of the block is fixed to the base 10 by means of screws 17, while the other end is connected to a bell crank 18 by means of a bolt 19 and nut 20. Preferably a coil spring 21 is interposed between one arm of the bell crank 18 and the end of the block 13.

The bell crank 18 is pivotally mounted on a pivot 22. The pivot 22 is secured to a piece of electrical insulating material 23 fixed to the base 10. Switch point 11 is carried by the free end of the other arm of the bell crank 18.

A second angle bracket 24 is secured to the base 10 and carries an adjusting screw 25 threaded therein. The adjusting screw is adapted to engage the bimetallic strip 14 in order to provide for temperature adjustments.

The two switch points 11 and 12 are adapted to be connected into a control circuit of any suitable electrical fuel control or the like by means of leads 26.

With the parts in the position shown in Figure 1 the switch points 11 and 12 are spaced from each other and the circuit in which they are placed is open. If the temperature of the room in which the thermostat is located falls below a predetermined point the bimetallic strip 14 bends to the left to bias switch point 12 against the switch point 11 and close the circuit. The fuel control or the device which is controlled by the thermostat will then operate so that more heat is supplied to the room. As soon as the room temperature reaches the desired level the strip 14 bends in the opposite direction, breaking the circuit and reducing the heat supplied to the room.

If the humidity of the room should go down, the temperature of the room should be raised slightly in order to maintain atmospheric conditions at a comfortable level. Thus, when the humidity decreases the block 13 shrinks slightly and rocks the bell crank 18 about its pivot 22 and moves switch point 11 toward switch point 12. The movement of the switch point 11 thus caused may or may not be sufficient to close the circuit, but in any event, it requires a smaller drop in room temperature for the strip 14 to close the circuit than it otherwise would. If the humidity of the room rises, block 13 elongates and moves the switch point 11 away from switch point 12, thus requiring a greater drop in temperature of the room to close the switch.

Thus, it will be seen that the humidity compensating device introduced into the thermostat structure always maintains a proper relationship between humidity and temperature and thus keeps the atmospheric conditions within the room at a comfortable level.

Figure 3:
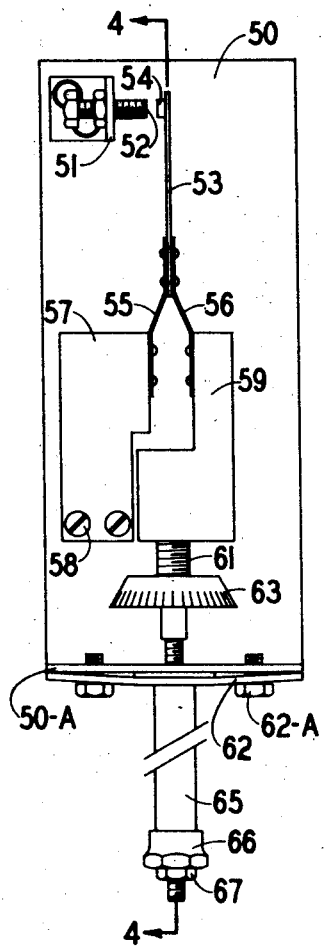
Figure 3 is a front elevational view of another form of the invention.
Figure 4:
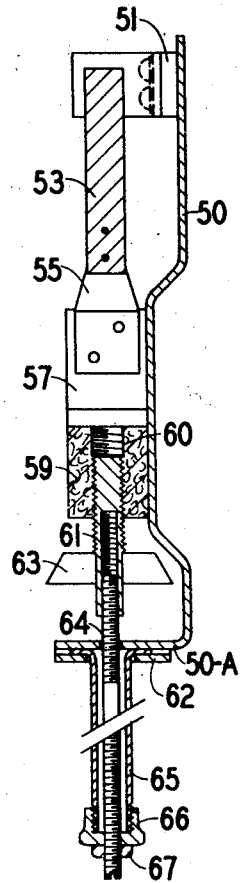
Figure 4 is a cross-sectional view taken on substantially the line 4—4 of Figure 3.

Figures 3 and 4 show a modified form of the invention. In this modification both the humidity responsive member and temperature responsive member are connected to the same switch point, while the other switch point is fixed on a suitable support.

A base 50 having a bottom flange 50a provides support for the parts of the thermostat construction. Rigidly mounted on the base adjacent the upper end is a bracket 51 which carries a switch point 52 threaded therein. The switch point may be adjusted by threading it in or out relative to the bracket. A relatively rigid metallic bar 53 carries a switch point 54 at its upper end. The lower end of bar 53 is riveted to two very flexible strips of thin metal 55 and 56. The lower ends of the strips 55 and 56 diverge slightly. The lower end of strip 55 is rigidly connected to a block 57 of wood or other suitable hydroscopic material which expands when its moisture content increases. The block is attached at its lower end only to the base 50 by means of screws 58.

The lower end of strip 56 is rigidly connected to a block of fiber or similar insulating material 59. The block 59 has a vertical hole 60 extending therethrough which is provided with internal threads of relatively high pitch. Threaded into the hole is a sleeve 61. The sleeve 61 is threaded externally to the same pitch as that of the threads in hole 60. The lower end of the sleeve 61 is internally threaded with threads of a rather low pitch. A knurled knob 63 is rigidly attached to the sleeve 61 whereby to rotate the same.

A long rod 64 threaded at its upper end is received in the internal threads in sleeve 61. The rod 64 should have a relatively low coefficient of heat expansion. The lower end of the rod is fixedly attached to the lower end of a cylindrical tube 65 by means of a nut 66 and lock nut 67. The tube 65 has a high coefficient of heat expansion. The upper end of tube 65 is fixedly connected to flange 50a on the base 50 by means of a clamping bar 62 secured to the flange 50a by cap screws 62a.

Since the tube 65 has a high coefficient of expansion and rod 64 has a low coefficient of expansion, an increase in temperature of the room in which the thermostat is placed will tend to pull the rod 64 downward and with it the sleeve 61 and block 59. This motion will be communicated to the bar 53 through the flexible metal strip 56 and will tend to swing the bar 53 to the right, as shown in Figure 3. That will move switch point 54 away from switch point 52. The strip 55 flexes to permit movement of the bar 53. Conversely, a decrease in room temperature will cause a relatively greater contraction of tube 65 than of rod 64 and will tend to move the switch 54 toward closing position.

If the humidity in the room increases, the wooden block 57 will elongate, and due to its connection to bar 53 will tend to swing the latter away from switch point 52 about the flexible strip 56. A decrease in humidity will shrink block 57 and create movement of the bar in the opposite direction.

Adjustment for temperature is provided for by the differentially threaded connection of the rod 64 with the sleeve 61, and the sleeve 61 with the block 59. Because the threads are of different pitch rotation of the knob 63 will move the block 59 up or down, as desired.

Figure 6:
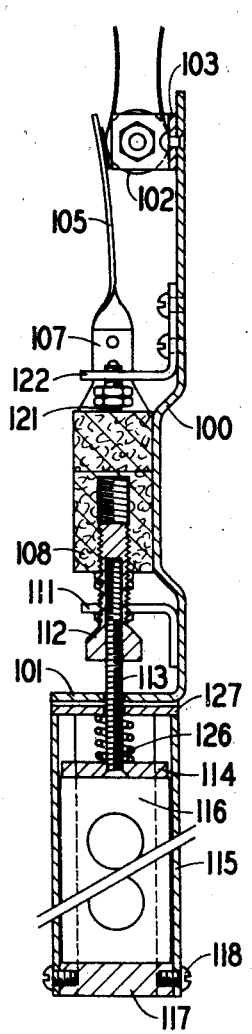
Figure 6 is a cross-sectional view taken on substantially the line 6—6 of Figure 5.
Figure 5:
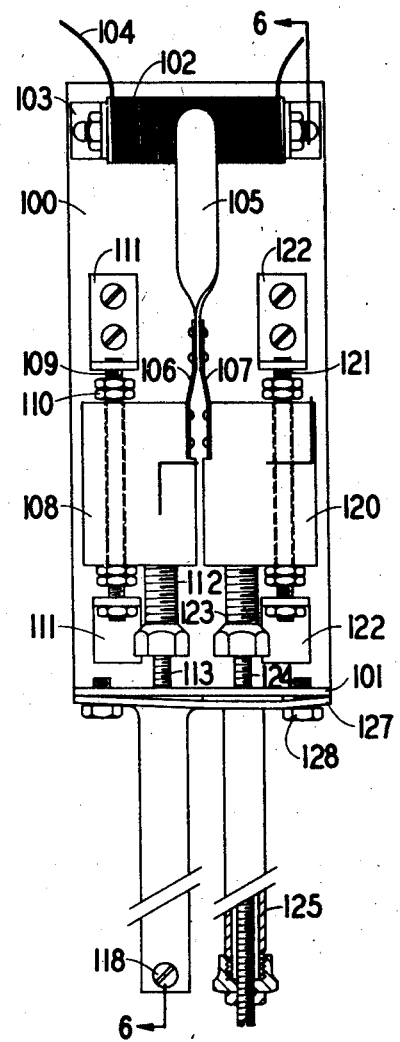
Figure 5 is a fragmentary elevational view of a still further modified form of the invention.

Figures 5 and 6 illustrate a still further modified form of the invention. Generally the construction may be said to be similar to that shown in Figures 3 and 4, but the humidity responsive element is somewhat different and is considerably more sensitive than those previously described. Also, the thermostat is disclosed as being associated with a potentiometer for controlling the current in an electrical fuel control of the type disclosed in our copending application Serial No. 521,094, filed February 4, 1944.

The structure shown in Figures 5 and 6 comprises a base 100 having a horizontal flange 101 at its lower end. At the upper end of the base a potentiometer coil 102 is mounted by means of suitable brackets 103. Leads 104 from the ends of the potentiometer are adapted to be connected into the control circuit.

A wiper arm 105 contacts the surface of the potentiometer coil and is adapted to be moved back and forth over the coil. The lower end of the wiper arm 105 is connected to two thin flexible strips 106 and 107 in a manner similar to the connection of bar 53 previously described. The lower end of strip 106 is connected to a block of fiber or similar material 108 which is slidably mounted for vertical movement upon a guide bar 109. The guide bar is threaded and is provided with adjustable lock nuts 110 which limit the vertical movement of the block 108. Guide bar 109 is supported on the base by brackets 111.

An internally and externally threaded sleeve 112 is threaded into a vertical hole in the block 108. The external threads of the sleeve 112 are of different pitch than the internal threads thereof so as to provide for a differential movement when the sleeve is rotated. A rod 113 is threaded into the sleeve 112. The lower end of the rod extends through a hole in flange 101 and is rigidly connected to a cross piece 114. This cross piece is slidable vertically in a pair of vertically elongated channels 115. The channels 115 are spaced apart to receive the cross piece 114 and are attached to the flange 101. Between the cross-piece 114 and the flange 101 is a coiled spring 126, normally under a compressive stress. One or more long, thin strips of wood 116 are inserted between the channels 115 and are held in place by a bottom support 117. The latter is attached to the channels by screws 118. Normally the wooden strips 116 engage the cross piece 114 at one end and the bottom support 117 at the other.

Another block 120, similar to block 108, is mounted upon base 100. The block 120 is mounted for vertical movement on a guide bar 121 affixed to brackets 122 in the same manner as the block 108 is mounted. The block 120 is connected to the lower end of flexible strip 107.

The block 120 is provided with a vertically extending opening therein which receives an externally and internally threaded sleeve 123 similar to sleeve 112. The sleeve 123 is threaded on to a vertical rod 124. The rod 124 extends down through a hole in the flange 101 and is connected at its lower end to a tube 125. The construction of the rod 124 and tube 125 is exactly the same as rod 64 and tube 65 described heretofore. The upper end of tube 125 is connected to flange 101 by a clamping strip 127 and cap screws 128.

When the tube 125 expands due to an increase in temperature, it biases the wiper arm 108 in a direction to the right (as viewed in Figure 5), while when the tube 125 contracts due to a decrease in temperature it swings the arm 108 in a direction to the left. This movement of the wiper arm relative to the potentiometer coil will cause a variation in the current flowing in the circuit in which the potentiometer is placed.

If the ambient humidity increases the wooden strips 116 expand, exerting a force on cross piece 114. This force is transmitted to block 108 and through it to the wiper arm 105, tending to swing the latter in a clockwise direction. The corresponding decrease in humidity causes the block to shrink and the arm is swung in a counter-clockwise direction.

The temperature responsive member comprising tube 125 and the humidity responsive member comprising the wooden strips 116 can be made as long as desired. Rather long parts are desirable because the overall expansion and contraction is relatively great. If the expansion and contraction are great, then the thermostat can be made very sensitive.

Furthermore, when the temperature and humidity responsive members are long they afford accurate control of conditions within the room because of their exposure to a wide zone. In other words, instead of being exposed to temperature conditions in but a single spot at, for instance, five feet from the floor, the usual thermostat location, the humidity and temperature responsive members may extend through a space of two feet or more if desired, from three feet to five feet from the floor, so as to control conditions in the room to better advantage.

It will be evident that the hygroscopic material employed in the devices described above need not be a block of wood. Other materials which vary in length with changes in humidity may be used. Neither is it necessary that the hygroscopic material be in the form of a block. It may take the form of an elongated strip, or even a hair such as is commonly employed in some hygrometers.

The scope of the invention is indicated in the appended claims.

We claim:

1. A thermostat comprising a support, a contact member on said support, an arm having a free end adapted to cooperate with said contact member in controlling an electrical temperature regulating circuit, and means for moving said arm in response to variations in ambient temperature and humidity and providing a floating support for said arm, said means comprising expansible and contractible temperature and humidity responsive elements, said humidity responsive element expanding under an increase in humidity and contracting under a decrease in humidity, said elements being attached to said arm at points spaced laterally from each other and remote from the free end of the arm, said elements also being attached to said support at points remote from their attachment to said arm.

2. A thermostat as defined in claim 1 wherein the connections between said elements and said arm are adjustable.

3. A thermostat as defined in claim 1 wherein said temperature responsive element comprises a pair of elongated parallel members having different coefficients of expansion, one of said members being operatively connected at one end only to said arm and at the other end to the other member, the other end of said other member being attached to said support.

4. A thermostat comprising a support, a contact member on said support, an arm having a free end adapted to cooperate with said contact member in controlling an electrical temperature regulating circuit, a pair of flexible strips connected to the other end of said arm and extending away therefrom in spaced relation, a humidity responsive element adapted to expand under an increase in relative humidity attached to one of said flexible strips, a temperature responsive element adapted to expand under an increase in temperature connected to the other of said flexible strips, and means for connecting said elements to said support.

JOHN W. MILLER.
RAYMOND E. FELL.

REFERENCES CITED

The following references are of record in the file of this patent:

UNITED STATES PATENTS

| Number | Name | Date |
| --- | --- | --- |
| 1,807,306 | Colman | May 26, 1931 |
| 2,064,197 | Dunham | Dec. 15, 1936 |
| 2,191,630 | Shutts | Feb. 27, 1940 |
| 2,175,469 | Kaufman | Oct. 10, 1939 |
| 2,229,612 | Pearce | Jan. 21, 1941 |
| 1,935,398 | Howry | Nov. 14, 1933 |
| 2,185,623 | Beam | Jan. 2, 1940 |
| 2,304,103 | Kelly | Dec. 8, 1942 |
| 2,314,989 | Kercher | Mar. 30, 1943 |